March 8, 1932. A. VANDERVELD 1,848,680
CHART ADJUSTMENT
Filed July 11, 1927 2 Sheets-Sheet 1

Inventor
Anthony Vanderveld
By
Frank E. Liverance, Jr.
Attorney

March 8, 1932. A. VANDERVELD 1,848,680
CHART ADJUSTMENT
Filed July 11, 1927  2 Sheets-Sheet 2.

Inventor
Anthony Vanderveld
By Frank E. Liverance, Jr.
Attorney

Patented Mar. 8, 1932

1,848,680

UNITED STATES PATENT OFFICE

ANTHONY VANDERVELD, OF GRAND RAPIDS, MICHIGAN

CHART ADJUSTMENT

Application filed July 11, 1927. Serial No. 204,734.

This invention relates to computing chart adjustments for combined cloth measuring and computing machines. In machines of this character, there is combined with a measuring machine, which includes indicators for telling the length of a cloth which has been measured in the machine, a computing chart driven in synchronism with the measuring mechanism and indicators, on which columns of computed figures appear for different lengths of goods at different prices. Each column is computed for a certain length of goods at a large number of prices. The chart is mounted at its ends on rollers and in the operation of the machine runs from one roller to the other underneath elongated openings through which the various columns of figures may be seen as they come thereto. It is important when the indicators show a certain length of goods has been measured, that the column of computed figures for such length on the computing chart shall come to said elongated opening in order that the computations referring to the measured length shown by the indicators may be seen and the cost obtained therefrom at any of the different prices at which goods may be sold, said prices being carried on price scales at the sides of the elongated openings through which the chart may be seen.

In practical manufacture of the rollers on which the chart is mounted, it is of course physically impossible to make all the rollers of the same exact diameter. There will be variations even though such variations are of micrometer magnitude and can be measured only in ten thousandths of an inch. It is also evident that charts will not always be of the same exact dimensions as to thickness throughout their entire length and it is an impossibility to connect a chart mounted on rollers with the operating mechanism of a measuring machine and have every column of cost computations on the chart properly appear at the elongated openings or windows through which it is to be seen at the time that it should, or when the indicators of the measuring mechanism indicate the length for which the columns are computed if reliance is placed alone on exactness of diameters of the measuring rollers and exactness as to the thickness of the chart. Therefore, in all machines of such character it is necessary to devise some means for adjusting the chart assembly in order that the proper computed column of figures for any of the measurements of cloth which may be made will appear at the elongated openings or windows so that it may be read at the time that the indicators show the amount for which the column is computed.

The widths of the openings or windows through which the columns of chart computations are to be seen is considerably greater than the width of a column of computations so that there is considerable leeway permitted in adjusting the chart, it being necessary only that the column of figures may be seen through the opening. And such column of figures can be seen through an opening whether it is on the exact longitudinal center line of said opening or is somewhat to one side or the other thereof. The measurement is taken from the indicators and may be had with exactness, in a properly designed measuring machine wherein reliance is placed on the indicators for measurement. The present invention is concerned with such chart adjustment for a combined computing and measuring machine and is particularly directed to a very simple, practical and effective means and method of adjustment, readily performed whenever necessary and with which each machine may be individually adjusted to take care of the particular chart rollers and the particular chart which is in the machine. And if, due to atmospheric conditions or any other cause the chart should increase or diminish in thickness or if, in the course of use it should elongate slightly, the adjustment is one which can be taken care of when the machine is serviced in a store where it is used. To these ends I have made the invention, the preferred embodiment of which is described in the following description and shown in the accompanying drawings, in which, Fig. 1 is a longitudinal vertical section through a combined cloth measuring and computing machine to which my invention is applicable.

Like reference characters refer to like parts in the different figures of the drawings.

Figure 1:
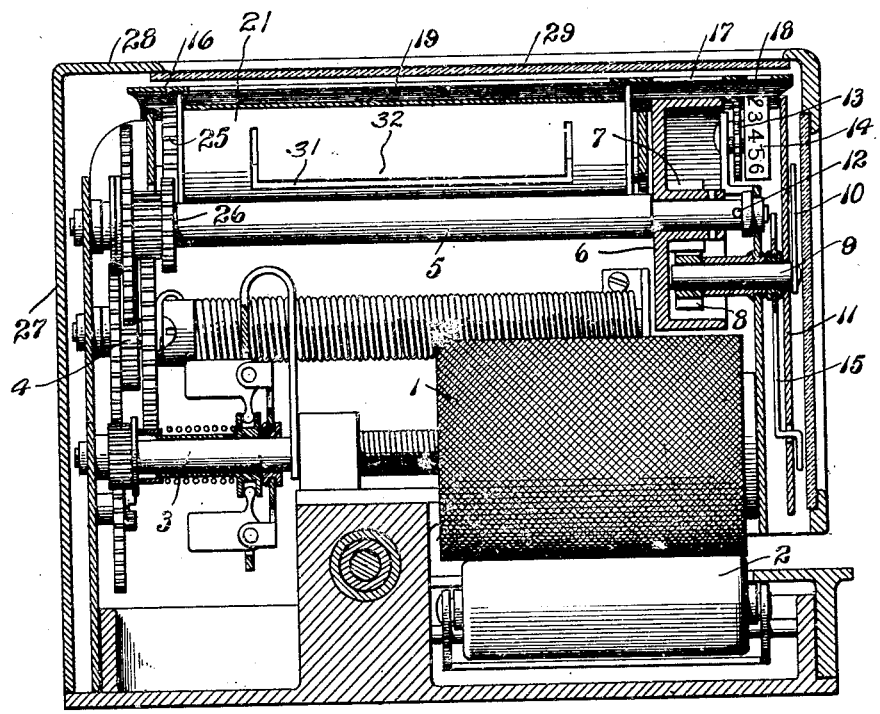
Figure 2:
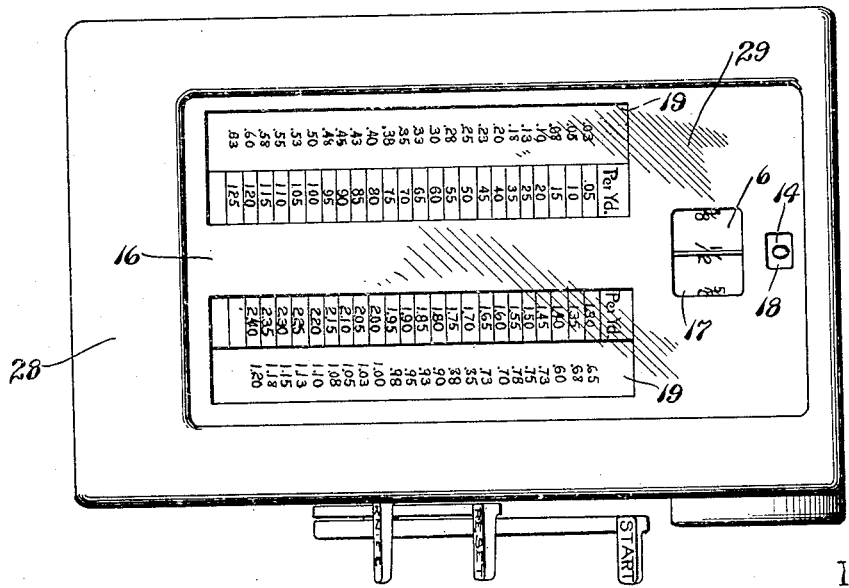
Fig. 2 is a plan view thereof.
Figure 3:
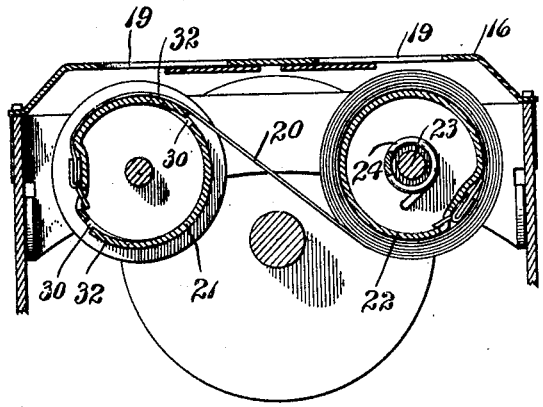
Fig. 3 is a fragmentary transverse section through the upper part of the machine, said section being through the chart assembly and indicating the manner in which the chart adjustment may be affected.
Figure 4:
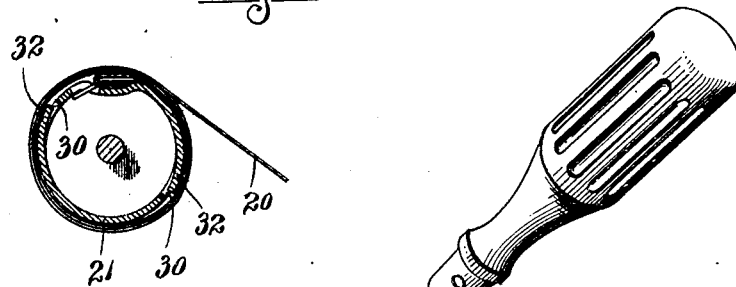
Fig. 4 is a fragmentary transverse section through a roller to which one end of the chart is attached and which may be adjusted to change its effective diameter or circumference, and, Fig. 5 is a perspective view of such roller illustrating the manner in which its effective diameter is changed.

The cloth measuring and computing machine to which the present invention is applicable includes a measuring roller 1 against which cloth is pressed by a pressure roller 2 so that the measuring roller is driven frictionally by the cloth as it is drawn between the rollers, thereby turning the shaft 3 on which the measuring roller is mounted. Shaft 3, through interposed gearing indicated as a whole at 4, drives the shaft 5 on which, near its front end, a drum 6 is fixed on the surface of which are indicating characters for fractions of a yard. The circumference of the measuring roller 1 is such and the gearing interposed between its shaft 3 and the shaft 5 is so designed that shaft 5 makes one revolution with each yard of goods drawn through the machine. A pinion 7 formed on the hub of the drum 6 drives a second pinion 8 attached to the rear end of the short shaft 9. An indicating hand 10 is fixed to the front end of the shaft 9 and moves over a vertical plate 11 on which indicating characters (not shown) for fractions of a yard appear arranged in circular form or like a dial. A pin 12 extends from the shaft 5 and, once with each revolution of the shaft, engages with a small gear 13 in front of and secured to which is an indicating wheel 14 having spaced consecutive yard measurement indicating figures thereon. Also loosely mounted on the shaft 9 is an indicating hand 15 which passes through a slot in the plate 11 and moves over a yards indicating scale (not shown). The method by which the hand 15 is moved is not disclosed in the drawing as it forms no particular part on the present invention.

Over the upper sides of the drum 6 and the wheel 14 a sheet metal plate 16 is located having two openings 17 and 18 over said drum and wheel so that the indications appearing at the upper sides of said drum and wheel may be seen through such openings.

In addition to the openings 17 and 18 the plate 16 has two elongated openings or windows 19 located one at each side of the longitudinal center line of the machine and substantially symmetrical with respect thereto. Through the windows the columns of computations printed on opposite sides of a chart 20 appear. The chart 20 is attached at its ends to two rollers 21 and 22, the former of which is a winding roller and the latter a take-up roller. The take-up roller 22 is secured to a shaft 23 around which is a coiled spring 24, one end attached to the shaft and the other to the roller, it being evident that the spring is tensioned when the chart is wound upon the winding roller 21. The winding roller is driven by means of a gear 25 secured to one end thereof and in mesh with a pinion 26 on the shaft 5. It is evident that during the progress of a measuring operation the winding roller 21 is rotated so as to wind the chart thereon, unwinding it at the same time from the take-up roller 22.

The mechanism of the measuring and computing machine is housed within a housing 27 which has a horizontal top 28 having a large window with glass 29 therein, the window being large enough to disclose all of the openings 17, 18 and 19.

In practice the roller 21 has a diameter very slightly less than what theoretically and technically it should have. Accordingly, when the chart assembly is complete, one end of the chart being attached to the roller 21 and the other to the roller 22 and the machine operated, the chart 20 will not wind on the roller 21 quite as fast as it should. The tester of the machine will operate the machine to its capacity limit of measurement, which is twelve yards, and will note by observation of the chart the extent of the error, and the approximate adjustment that is required. And it is then necessary to adjust the winding roller 21 to increase its effective diameter to compensate for the error.

Figure 5:
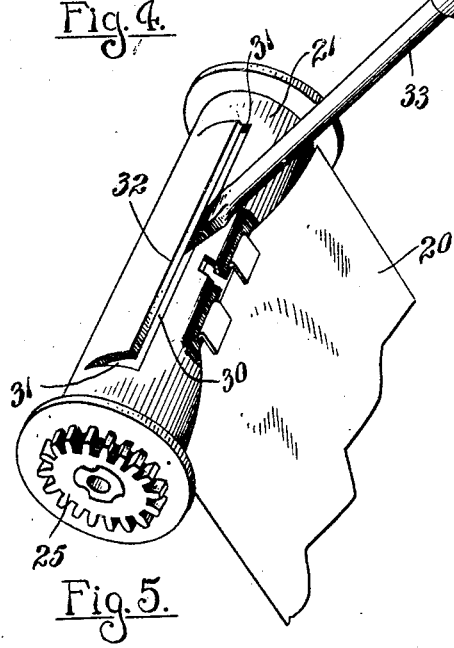

With my invention the roller 21 is sawed or otherwise cut lengthwise for a part of its length at diametrically opposed points forming each of the slots 30 therein. At each end of the slot 30, the roller is sawed at right angles to make the two branches 31 thereby forming an elongated tongue or wing 32 at each side of the roller. These tongues 32 may be sprung upward by inserting the blade of a screw-driver, such as 33 in Fig. 5, into a slot 30 and bending the tongue 32 outward. The tester of the machine, knowing the amount of error that there is in the chart, in a very short time knows the amount that he should bend tongues 32 outward. And if through inadvertance the same are not bent out far enough or are carried out too far it may be easily corrected so that in a very short time and upon one or two trials the effective diameter of the roller has been increased the necessary amount that the columns of computations on the chart will come properly to the windows 19 so as to be seen therethrough when the measurement for which the column is computed is indicated by the indicators 6 and 14, or 10 and 15.

This adjustment of the roller 21 is not a fine adjustment and need not be exact as previously stated due to the extra width of the windows 19 over the width of a column of chart computations. The adjustment need be approximate only and can be done very readily by the workmen who test the machine before it leaves the factory, requiring only a little experience and skill.

This invention has proved very satisfactory for the purposes for which it is made. It is very economical, the method followed is simple and very practical, and in a store, should there later be variations due to wear on the chart, absorption of moisture or the like, the adjustment to take care of the variations is easily performed. The tongues 32, being integral with the roller 21, always remain in place and do not disconnect and become lost. The invention is defined in the appended claims and is to be considered comprehensive of all coming within their scope.

I claim:

1. In a cloth measuring and cost computing machine having indicators for showing measured length of goods and a chart assembly including two rollers and a chart connected at its respective ends to said rollers for winding from one to the other and vice versa, and having windows through which the chart may be seen, said chart carrying computations bearing relation to measurements of goods performed on said machine, and said machine having means for driving said indicators and one of said chart rollers, means for adjusting the effective diameter of a chart roller comprising, a tongue, circumferentially disposed on said roller and adapted to be bent toward or away from the axis of said roller.

2. In a machine of the class described, a chart assembly comprising two rollers, a chart attached at its respective ends to said rollers and winding from one to the other and vice versa, one of said rollers having a tongue located circumferentially of the roller and adapted to be bent to increase or decrease the effective diameter of the roller.

3. In a machine of the class described, a chart assembly comprising a tubular roller having a slot cut in a side thereof substantially parallel to the axis of the roller and having spaced apart branch slots leading into the first slot, thereby defining a tongue in said side of the roller, a chart attached at one end to the roller and a second roller to which the opposite end of the chart is connected, said tongue being adapted to be bent to any desired position to adjust the effective diameter of said first roller.

4. In combination with a measurement chart, a roller therefor about which the chart is wound, a tongue on the periphery of said roller, said tongue being adapted to be bent toward or away from the axis of the roller, and means to fasten the chart to the roller.

5. In combination with a measurement chart, a roller therefor about which the chart is wound, a portion of the periphery of said roller being yieldable whereby it is extensible or retractable relative to the remainder of the roller and means to fasten the chart to the roller.

6. In combination with a measurement chart, a roller therefor about which the chart is wound, means for fastening the chart to the roller, and said roller having a portion of its periphery movable substantially radially whereby its circumference may be increased or decreased.

7. In combination with a measurement chart, a roller therefor about which the chart is wound, and two spaced tongues on the periphery of the roller, said tongues being adapted to be bent toward or away from the axis of the roller.

In testimony whereof I affix my signature.

ANTHONY VANDERVELD.